United States Patent
Ochi et al.

(10) Patent No.: US 7,420,891 B2
(45) Date of Patent: Sep. 2, 2008

(54) OPTICAL PICKUP DEVICE HAVING HEAT RADIATION MEANS AND OPTICAL DISK APPARATUS USING THE SAME

(75) Inventors: Manabu Ochi, Fujisawa (JP); Hirofumi Taguchi, Yokohama (JP); Hiroyuki Toyoda, Chiyoda (JP)

(73) Assignee: Hitachi Media Electronics Co., Ltd., Mizusawa-Shi (JP)

( * ) Notice: Subject to any disclaimer, the term of this patent is extended or adjusted under 35 U.S.C. 154(b) by 683 days.

(21) Appl. No.: 11/108,708

(22) Filed: Apr. 19, 2005

(65) Prior Publication Data
US 2005/0281142 A1 Dec. 22, 2005

(30) Foreign Application Priority Data
Jun. 16, 2004 (JP) ............................. 2004-177719

(51) Int. Cl.
*G11B 21/16* (2006.01)
(52) U.S. Cl. ............ 369/44.15; 720/679; 720/682
(58) Field of Classification Search ............ 369/44.15; 720/679, 682
See application file for complete search history.

(56) References Cited

U.S. PATENT DOCUMENTS

| | | | |
|---|---|---|---|
| 6,351,445 B1 * | 2/2002 | Ng et al. ................... | 720/679 |
| 6,731,587 B1 | 5/2004 | Mizuno | |
| 6,831,882 B1 | 12/2004 | Takashima | |
| 6,906,984 B2 * | 6/2005 | Imaizumi ................ | 369/44.15 |
| 7,219,358 B2 * | 5/2007 | Suzuki et al. ............. | 720/682 |
| 2003/0234990 A1 * | 12/2003 | Akanuma ................ | 359/819 |

FOREIGN PATENT DOCUMENTS

| | | |
|---|---|---|
| CN | 1339156 | 3/2002 |
| JP | 2003-045053 | 2/2003 |

* cited by examiner

*Primary Examiner*—Gautum R Patel
(74) *Attorney, Agent, or Firm*—Antonelli, Terry, Stout & Kraus, LLP.

(57) ABSTRACT

An optical pickup device comprises a semiconductor laser that causes outgoing of laser beam used for reproduction and recording of information on an optical disk, and an objective lens that conducts the laser beam outgoing from the semiconductor laser to the optical disk. The objective lens is driven by a yoke, a focusing coil, a tracking coil, etc. These elements are accommodated in a pickup housing. First and second bearing portions supporting the pickup housing to make the same movable are attached to the pickup housing and arranged on both sides with the objective lens therebetween. The yoke is thermally connected to the first bearing portion positioned on an opposite side of the yoke to the semiconductor laser.

18 Claims, 5 Drawing Sheets

OPTICAL PICKUP DEVICE HAVING HEAT RADIATION MEANS AND OPTICAL DISK APPARATUS USING THE SAME

BACKGROUND OF THE INVENTION

The present invention relates to an optical pickup device that reproduces information recorded on a recording surface of an optical disk, or records information on the recording surface, and an optical disk apparatus using the same.

Conventionally, in optical pickup devices, a semiconductor laser, a laser drive IC, a high-frequency module, an optical detector, focusing coils, and tracking coils, which generate heat at the time of recording and reproduction, are mounted. When these heat generating parts generate heat, temperature of an optical pickup device rises to bring about a fear that generated heat causes degradation in performance, deterioration in service life, malfunction, etc. of parts. Hereupon, in order to dissolve such disadvantage, an optical disk apparatus described in JP-A-2003-45053 includes weights bonded to a focusing coil and a tracking coil, the weights being partially exposed to the atmosphere to heighten an efficiency of heat radiation.

As described above, heat generated from the focusing coil and the tracking coil in the optical disk apparatus described in JP-A-2003-45053 is radiated to the atmosphere through the weights bonded to the coils. Since the performance of heat radiation from the weights to the atmosphere is dependent upon the rotating speed of an optical disk, it is decreased when the rotating speed of an optical disk is low. That is, in the case where an optical pickup device is one for CD, DVD, etc., a major part of heat generated from a focusing coil and a tracking coil is transmitted to a pickup housing at the time of low-speed recording, so that temperature of the pickup housing rises. As a result, temperature of a semiconductor laser mounted on the pickup housing rises. When temperature of the semiconductor laser rises, degradation in performance and shortening in service life are caused in the semiconductor laser.

BRIEF SUMMARY OF THE INVENTION

The invention has been thought of in view of a disadvantage in the prior art, and has its object to prevent degradation in performance, deterioration in service life, and malfunction of a semiconductor laser, which are caused by heat generated from a focusing coil and a tracking coil. Thereby, reliability in an optical pickup device and an optical disk apparatus is enhanced.

A feature of the invention to attain the object resides in that in an optical pickup device, a first bearing portion arranged on an opposite side to a semiconductor laser to conduct laser beam to an objective lens is thermally connected to a yoke provided in an optical pickup to drive the objective lens. In this feature, the first bearing portion is preferably connected to the yoke through a metallic plate. The yoke may be extended toward the first bearing portion to connect between the yoke and the first bearing portion. A pickup cover opposed to an optical disk may be connected to the yoke and the first bearing portion. A fixed portion connected to a lens holder, which holds an objective lens, through a support member is preferably arranged between the objective lens and the semiconductor laser. Tracking coils may be brought into contact with focusing coils in positions corresponding to inner and outer edges of the optical disk. A metallic plate having an elasticity may be connected to the yoke and the metallic plate may be brought into contact with a metallic member inside an optical pickup, which is disposed in an opposite region of the yoke to the semiconductor laser.

According to the invention, heat generated from focusing coils and tracking coils is conducted in an opposite direction to a laser mount position in a pickup housing, so that it is possible to suppress temperature rise in the semiconductor laser of the optical pickup device, thus enabling preventing degradation in performance, deterioration in service life, and malfunction of the semiconductor laser.

Other objects, features and advantages of the invention will become apparent from the following description of the embodiments of the invention taken in conjunction with the accompanying drawings.

DETAILED DESCRIPTION OF THE INVENTION

Several embodiments of an optical pickup device and an optical disk apparatus including the optical pickup device, according to the invention, will be described hereinafter with reference to the drawings.

Figure 8:
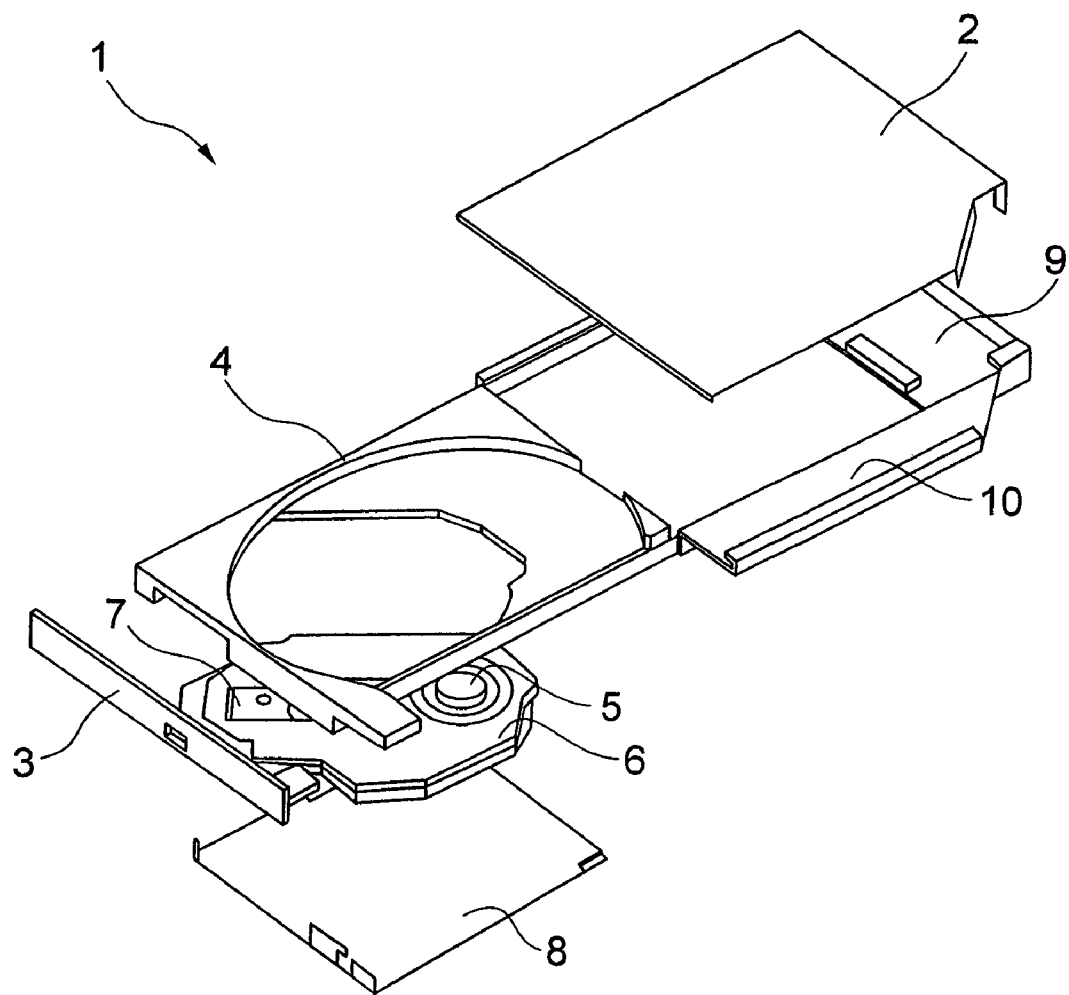
FIG. 8 is an exploded perspective view of an embodiment of an optical disk apparatus according to the invention.

FIG. 8 is an exploded perspective view of an embodiment of an optical disk apparatus 1 according to the invention. The optical disk apparatus 1 includes an optical pickup device 7 that records information on an optical disk (not shown), or reads information from the optical disk. The optical pickup device 7 is mounted on a unit mechanism 6. On the unit mechanism 6, mounted are, in addition to the optical pickup device 7, an optical pickup feed mechanism (not shown) that moves the optical pickup device 7 radially of an optical disk along guide shafts, and a spindle motor 5 that rotates the optical disk. The unit mechanism 6 is mounted on a disk tray 4 that carries in an optical disk into the apparatus or carries out an optical disk outside the apparatus. An underside of the disk tray 4 is covered by an undercover 8.

A circuit substrate 9 on which semiconductor parts for controlling and driving respective parts in the optical disk apparatus 1 and performing signal processing are mounted is arranged at the back of the disk tray 4. A top casing 2 and a bottom casing 10 are arranged above and below the disk tray 4 and the optical pickup device 7, and a front panel 3 is arranged on the front side where the disk tray 4 moves. That is, the optical disk apparatus 1 is covered by the top casing 2, the bottom casing 10, and the front panel 3.

Figure 1:
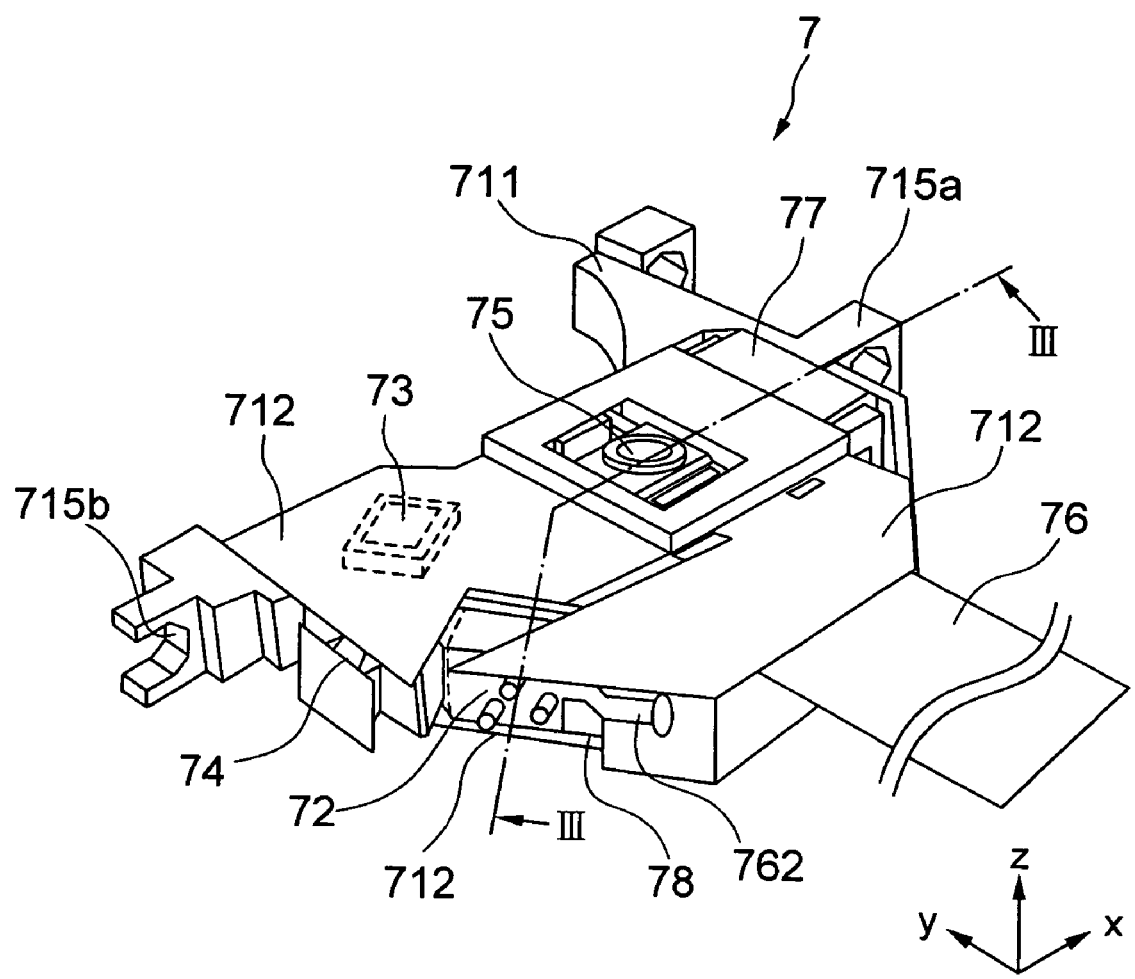
FIG. 1 is a perspective view showing a first embodiment of an optical pickup device according to the invention.
Figure 2B:
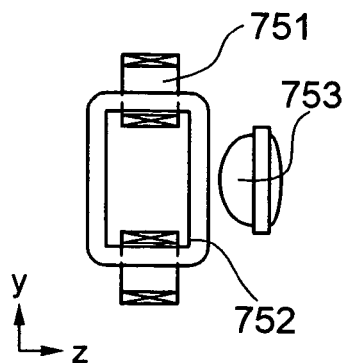
FIGS. 2A to 2C are views showing an essential part of the optical pickup device shown in FIG. 1.
Figure 2A:
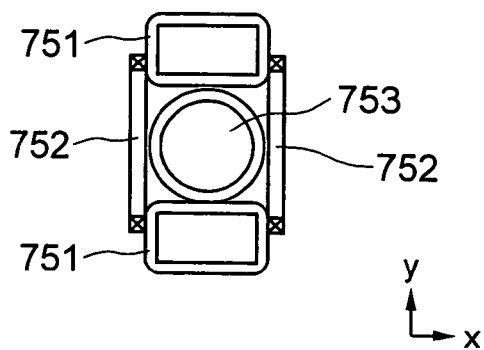
Figure 2C:
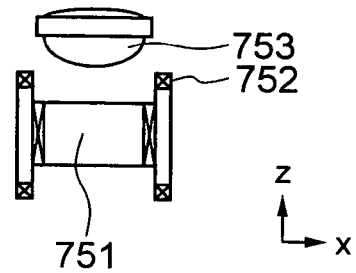
Figure 3:
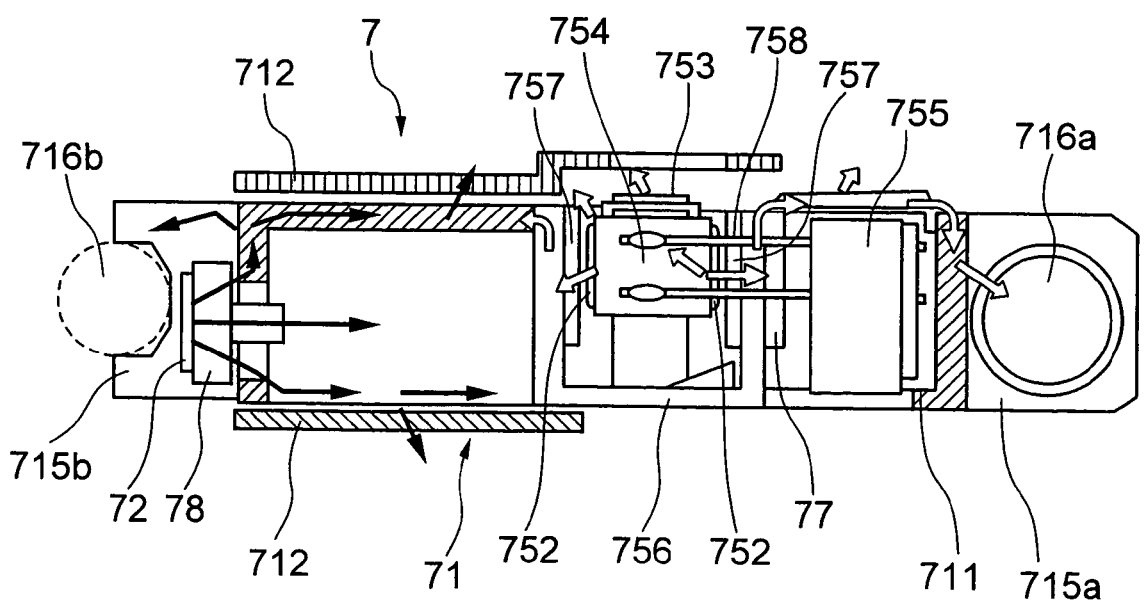
FIG. 3 is a cross sectional view taken along a line III-III in FIG. 1.

FIG. 1 is a perspective view of the optical pickup device 7 used in the optical disk apparatus 1, FIG. 2A to 2C are views showing an objective-lens drive device provided in the optical-pickup device 7, and FIG. 3 is a cross sectional view taken along a line III-III in FIG. 1. The optical pickup device 7 comprises an objective-lens drive device 75 on which an objective lens 753 is mounted substantially centrally thereof. A semiconductor laser 72 is arranged on one end side, that is, this side in FIG. 1, of the objective-lens drive device 75, and a laser drive IC 73 is arranged between the semiconductor laser 72 and the objective-lens drive device 75.

An optical detector 74 is arranged close to the semiconductor laser 72. A flexible substrate 76 is arranged at the back of the objective-lens drive device 75. The optical pickup device 7 also comprises a front monitor and optical parts, which are not shown, and these respective parts are mounted on a pickup housing 71. Provided on both right and left ends of the optical pickup device 7 are first and second bearing portions 715a, 715b that support the optical pickup device 7 in a manner to enable direct acting of the same when the optical pickup device 7 is to be driven in a depthwise direction (y direction) of the optical disk apparatus 1.

The semiconductor laser 72 generates laser beam that records information on an optical disk, and reproduces information from an optical disk. The laser drive IC 73 drives and controls laser beam generated from the semiconductor laser 72. The laser drive IC 73 comprises a circuit that creates a recording signal waveform called light strategy that transmits a favorable high frequency signal to the semiconductor laser 72. The front monitor monitors an output of the semiconductor laser 72. The optical parts comprise a prism, a mirror, and a lens, and conduct laser beam generated from the semiconductor laser 72 to an optical disk. The optical detector 74 converts reflected light from an optical disk into an electric signal.

The objective-lens drive device 75 comprises the objective lens 753, a lens holder 754, a support member 758, a fixed portion 755, magnets 757, and a yoke 756. The objective lens 753 condenses laser beam to accurately form a focus in a predetermined position on an information recording surface of an optical disk. As shown in FIG. 2A (a plan view), FIG. 2B (a front view), and FIG. 2C (a side view), focusing coils 751 having a center of winding in a z-direction are arranged symmetrically on both sides of the objective lens 753 in a y-direction to drive the objective lens 753 in a focusing direction (direction of optical axis: z-direction).

Tracking coils 752 having a center of winding in a x-direction are arranged symmetrically on both sides of the objective lens in the x-direction to drive the objective lens 753 in a tracking direction (direction perpendicular to an optical axis and depthwise of the optical disk apparatus 1: y-direction). The objective lens 753, the focusing coils 751, and the tracking coils 752 are held on the lens holder 754.

The lens holder 754 is made of a resin in a form of a hollow rectangular prism having a lower surface and one of sides opened, and elastically supported on the fixed portion 755 through four rod-shaped support members 758. The magnets 757 generate magnetic flux acting on the focusing coils 751 and the tracking coils 752 and cooperate with the yoke 756 to form a magnetic circuit.

The flexible substrate 76 connects between electronic parts mounted on the circuit substrate 9 and the optical pickup device 7. The flexible substrate 76 comprises a signal transmission flexible substrate 761 that inputs and outputs a signal and supplies electric power, and a radiating flexible substrate 762 arranged near to the semiconductor laser 72 to radiate heat generated from the semiconductor laser 72 to the pickup housing 71. The radiating flexible substrate 762 is integrally formed with the signal transmission flexible substrate 761.

The pickup housing 71 comprises a pickup housing body 711 that accommodates therein the objective-lens drive device 75, and a metallic pickup cover 712 that covers upper and lower surfaces of the pickup housing body 711. The pickup cover 712 holds down the flexible substrate 76 to cut off electromagnetic waves to various electronic parts provided on the optical pickup device 7. The first and second bearing portions 715a, 715b, are attached to the pickup housing 71 and are used to move the optical pickup device 7 along guide shafts (not shown).

Among the parts mounted on the optical pickup device 7, the focusing coils 751 and the tracking coils 752, which are mounted on the objective-lens drive device 75, the semiconductor laser 72, the laser drive IC 73, the front monitor, and the optical detector 74 generate heat when information is to be recorded on an optical disk, or reproduced therefrom. Heat generated at the time of recording or reproduction of information raises the semiconductor laser 72 in temperature, and makes a cause for abnormality in the optical pickup device 7 when a set temperature is exceeded. Therefore, the semiconductor laser 72 must be at a temperature equal to or lower than the set temperature even at the time of recording or reproduction of information.

The cause for temperature rise in the semiconductor laser 72 is divided into one due to heat generated by the semiconductor laser 72 itself, and one due to transmission of heat, which is generated by the laser drive IC 73 and the like, to the semiconductor laser 72. In order to suppress temperature rise in the semiconductor laser 72, the performance of heat radiation from the semiconductor laser 72 should be enhanced, or that influence of the heat generating parts to the semiconductor laser 72 should be reduced. Among the heat generating parts, the laser drive IC 73 is liable to have an influence on the semiconductor laser 72 since the semiconductor laser 72 and the laser drive IC 73 are arranged close to each other in order to ensure a signal transmission line characteristics.

Hereupon, according to the embodiment, the laser drive IC 73 is connected to the pickup cover 712 through the flexible substrate 76 by means of a heat conductive member such as silicone or the like. In fixing the pickup cover 712 to the pickup housing body 711, a measure is taken to avoid that situation, in which the pickup cover 712 covers the semiconductor laser 72 to obstruct radiation of heat from the semiconductor laser 72.

That is, a larger notch than a region of projection, in the z-direction, of the semiconductor laser 72 and a laser holder 78 that holds the semiconductor laser 72 is formed on the pickup cover 712. The semiconductor laser 72 and the laser drive IC 73 can radiate heat without being obstructed by each other, so that it is possible to suppress temperature rise in the semiconductor laser 72 and the laser drive IC 73.

The procedure of mounting and a heat radiation path for the semiconductor laser 72 will be described with reference to FIG. 3. In FIG. 3, solid arrows indicate a heat radiation path for the semiconductor laser 72, and blank arrows indicate a heat radiation path for the focusing coils 751 and the tracking coils 752. The semiconductor laser 72 is press fitted into, or brought into surface contact with a recess formed in the laser holder 78 to be bonded and fixed thereto. The semiconductor laser 72 fixed to the laser holder 78 is regulated in position and angle. Thereafter, the laser holder 78 is fixed in a recess formed in the pickup housing 71 by means of an adhesive. Since it is necessary to regulate the semiconductor laser 72 in position and angle, the laser holder 78 is not brought into contact with the pickup housing 71 but fixed thereto by means of an adhesive with a spacing of several hundreds of μm to several mm therebetween.

The radiating flexible substrate 762 is electrically and thermally connected at one end thereof to a ground terminal of the semiconductor laser 72 and at the other end thereof to the pickup housing 71. Thereby, heat radiated from the semiconductor laser 72 to the pickup housing 71 can be increased in quantity, so that it is possible to suppress temperature rise in the semiconductor laser 72. Further, the radiating flexible substrate 762 is caused to branch from the signal transmission flexible substrate 761 to extend in an opposite direction to the laser drive IC 73, that is, in a—x-direction to be thermally connected to the pickup housing 71. The semiconductor laser 72 and the laser drive IC 73 can radiate heat without being obstructed by each other, so that it is possible to suppress temperature rise in the semiconductor laser 72 and the laser drive IC 73.

When electric current is caused to flow through the focusing coils 751 and the tracking coils 752 in order to drive the objective lens 753, the objective lens 753 is moved in the focusing direction and in the tracking direction. At this time, the focusing coils 751 and the tracking coils 752 generate heat, so that not only the focusing coils 751 and the tracking coils 752 but also the objective lens 753 and the lens holder 754 rise in temperature. When the focusing coils 751 and the tracking coils 752 rise in temperature, electric current to be supplied to the focusing coils 751 and the tracking coils 752 is restricted. As a result, insufficiency in power makes it impossible for the objective lens 753 to adequately follow surface fluctuation and eccentricity of an optical disk.

When heat generated by the focusing coils 751 and the tracking coils 752 is not transmitted to the whole lens holder 754 uniformly, a nonuniform temperature distribution is generated in the lens holder 754 and the objective lens 753. When some temperature difference is generated in the objective lens 753, the objective lens 753 is deformed nonuniformly, so that optical aberration and blooming are caused at a focal point, at which light is condensed on an information recording surface of an optical disk, and a signal from the optical disk cannot be correctly read. In order to avoid such disadvantage, temperature rise in the focusing coils 751 and the tracking coils 752 is suppressed to make temperature in the lens holder 754 as uniform as possible.

A heat radiation path for the focusing coils 751 and the tracking coils 752, which are made uniform in temperature distribution will be described hereinafter. As described above, the focusing coils 751 and the tracking coils 752 are fixed to the lens holder 754 and the coils 751, 752 are in contact with each other through an insulating film. Thereby, heat generated by the focusing coils 751 and the tracking coils 752 is spread to the whole surface of the lens holder 754 by way of heat conduction of the respective coils 751, 752 themselves, so that it is possible to suppress temperature rise in the focusing coils 751 and the tracking coils 752.

Since temperature rise in the focusing coils 751 and the tracking coils 752 is suppressed, it is possible to increase an allowable current for the focusing coils 751 and the tracking coils 752. Thereby, it is possible to heighten the follow-up property with respect to surface fluctuation and eccentricity of an optical disk to enhance the recording/reproducing speed of the optical disk apparatus 1. Further, it is possible to make temperature in the lens holder 754 uniform and to suppress nonuniform deformation of the objective lens 753 caused by heat generated from the coils 751, 752. Optical aberration and blooming at a spot, at which light is condensed by the objective lens, are prevented, so that it is possible to favorably perform reproduction and recording on an optical disk.

A heat radiation path, through which heat transmitted to the lens holder 754 is radiated to the pickup housing 71 will be described hereinafter. Heat generated by the focusing coils 751 and the tracking coils 752 is diffused to the whole lens holder 754 by the coils 751, 752 themselves. A part of the diffused heat is radiated directly to a surrounding air by a rotating flow, which is caused by an optical disk. The remainder of the diffused heat is caused by heat conduction and radiant heat transfer to be transmitted to the pickup housing 71 through the magnets 757 and the yoke 756 from the lens holder 754 while being diffused. Then the heat is radiated around the optical pickup device 7.

By the way, a quantity of heat radiated directly to a surrounding air by the rotating flow of an optical disk is dependent upon the rotating speed of an optical disk and a position of the optical pickup device 7. Such speed and position are determined by the specification of speeds of recording and reproduction of the optical disk apparatus 1 and cannot be chosen optionally. In other words, with the optical disk apparatus 1, it is inevitable to operate an optical disk in a region of small rotating speeds. When an optical disk is small in rotating speed, a quantity of heat radiated directly to a surrounding air by the rotating flow of an optical disk is decreased, and most of heat generated by the focusing coils 751 and the tracking coils 752 is transmitted to the magnets 757 and the yoke 756 by way of heat conduction and radiant heat transfer. Thereafter, the heat is radiated to surroundings while being diffused to the pickup housing 71.

As shown in FIG. 3, heat generated from the semiconductor laser 72 is radiated to a surrounding air and the guide shafts 716a, 716b through the pickup housing 71. When heat generated from the focusing coils 751 and the tracking coils 752 also flows into a neighborhood of the semiconductor laser 72 in the pickup housing body 711, a larger quantity of heat is radiated around the semiconductor laser 72 than that with the case where only heat generated from the semiconductor laser 72 is radiated, so that the neighborhood of the semiconductor laser 72 in the pickup housing body 711 rises in temperature to cause temperature rise in the semiconductor laser 72.

Hereupon, according to the embodiment, the first bearing portion 715a positioned on an opposite side of the yoke 756 to the semiconductor laser 72 and the yoke 756 are connected to each other by a metallic radiating member 77. Heat transmitted to the magnets 757 and the yoke 756 from the focusing coils 751 and the tracking coils 752 is radiated to surroundings through the first bearing portion 715a. Thereby, it is possible to decrease that quantity of heat transmitted to the magnets 757 and the yoke 756 from the focusing coils 751 and the tracking coils 752, which has been transmitted to the pickup housing body 711 on the side of the semiconductor laser 72, so that it is possible to suppress temperature rise in the pickup housing body 711 around the semiconductor laser 72, and hence temperature rise in the semiconductor laser 72.

In addition, the radiating member 77 having a L-shaped cross section is arranged on the side of the objective-lens drive device 75 toward the fixed portion 755. A part of the radiating member 77 is opposed to an optical disk. The rotating flow by the optical disk strikes directly on the radiating member 77 to transmit heat generated by the focusing coils 751 and the tracking coils 752 to the first bearing portion 715a, and radiate the heat directly to surroundings. In this manner, it is possible to increase that quantity of heat generated from the focusing coils 751 and the tracking coils 752, which is transmitted in an opposite direction to the semiconductor laser 72 to be radiated, thus enabling decreasing a quantity of heat transmitted to the pickup housing body 711 on the side of the semiconductor laser 72.

As a result, it is possible to further suppress temperature rise in the pickup housing body 711 around the semiconductor laser 72. Also, it is possible to suppress temperature rise in the semiconductor laser 72. Since a part of the radiating member 77 is also arranged on that surface of the fixed portion 755, which is opposed to an optical disk, it acts as a protective cover for the substrate mounted on the fixed portion 755. Since the radiating member 77 is provided in this manner, wiring is free from touch by mistake at the time of assembly or the like, handling is made easy in assembly activity, and reliability in the optical pickup device 7 is enhanced.

As described above, while a part of the radiating member 77 is opposed to an optical disk and a tip end of the radiating member extends to the first bearing portion 715a, the remainder of the radiating member 77 is folded to be pushed against and fixed to an upright surface (vertical surface in FIG. 3) of the yoke 756. That is, the radiating member 77 is connected to the yoke 756 and the pickup housing body 711 in different planes.

With such construction, it is possible to closely contact and fix the radiating member 77 and the yoke 756 to each other and closely contact and fix the radiating member 77 and the pickup housing body 711 to each other without heightening the radiating member 77 in dimensional accuracy, which decreases heat resistance of the contact portions. Since the contact heat resistance is small, it is possible to increase a quantity of heat transmitted from the focusing coils 751 and the tracking coils 752 in an opposite direction to the semiconductor laser 72 and to reduce a quantity of heat transmitted to the pickup housing body 711 on the side of the semiconductor laser 72. Accordingly, it is possible to suppress temperature rise in the pickup housing body 711 around the semiconductor laser 72 and temperature rise in the semiconductor laser 72.

Further embodiments of the optical pickup device 7 according to the invention will be described with reference to FIGS. 4 to 7. All these drawings correspond to the III-III cross section in FIG. 1.

Figure 4:
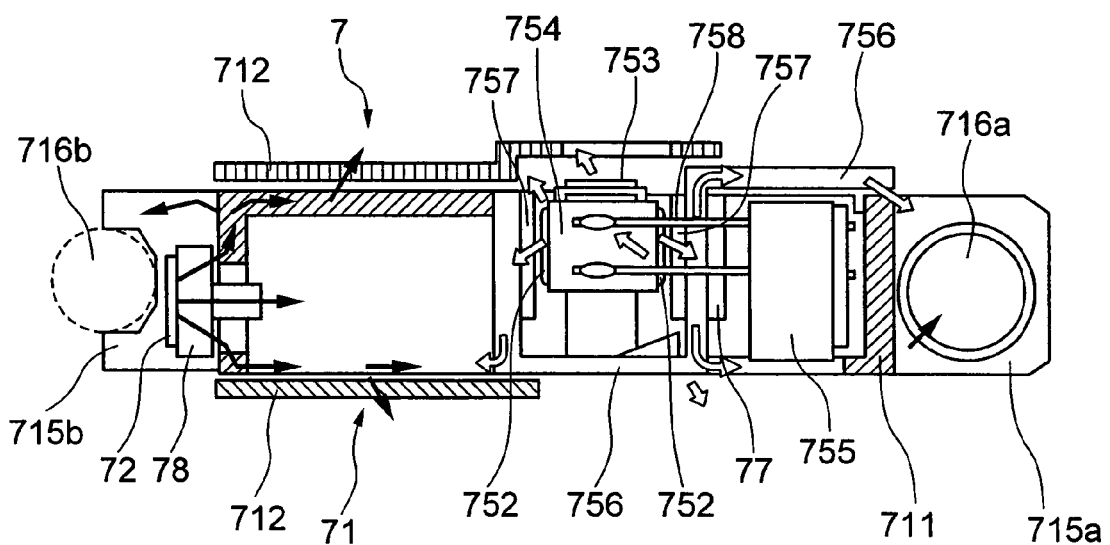
FIG. 4 is a vertical cross sectional view of a second embodiment of an optical pickup device according to the invention.

While the radiating member 77 connects between the yoke 756 and the first bearing portion 715a in the first embodiment of the optical pickup device 7 shown in FIG. 3, a second embodiment of an optical pickup device 7 shown in FIG. 4 is different from the first embodiment in that a part of a yoke 756 extends to a first bearing portion 715a. That is, an upright portion of the yoke 756 remote from a semiconductor laser 72 is extended and connected to a bearing portion 715a remote from the semiconductor laser 72. The remaining construction is the same as that in the first embodiment shown in FIG. 3.

The yoke 756 itself makes a radiating member that transmits heat of focusing coils 751 and tracking coils 752 to the bearing portion 715a. According to the second embodiment, locations of connection are reduced and heat resistance in contact portions is decreased as compared with the first embodiment shown in FIG. 3. Further, parts can be reduced in cost without bringing about an increase in the number of parts and assembling processes.

Figure 5:
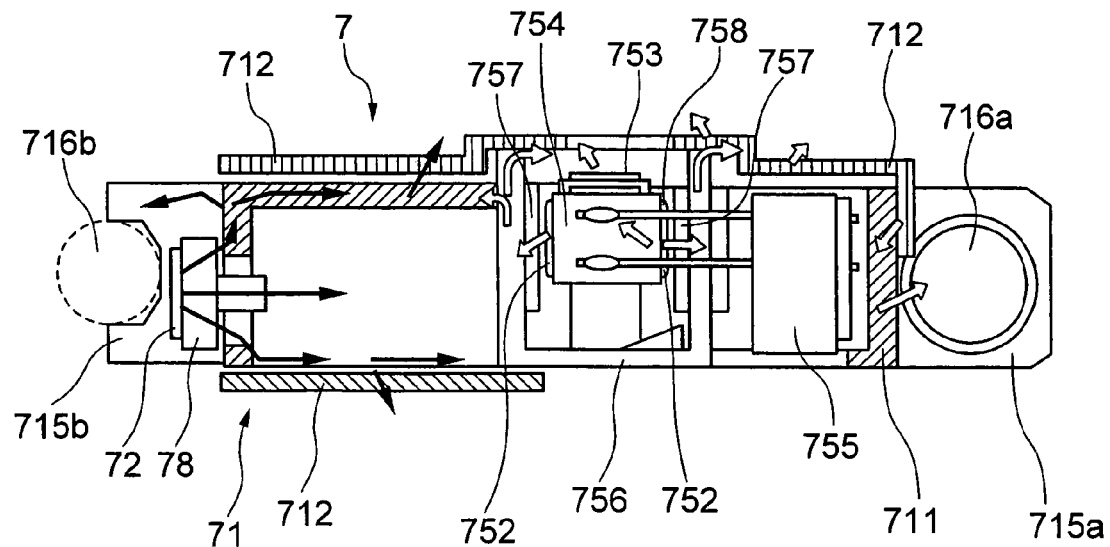
FIG. 5 is a vertical cross sectional view of a third embodiment of an optical pickup device according to the invention.

FIG. 5 shows a third embodiment of the optical pickup device 7. Instead of providing a radiating plate, an upright portion of a yoke 756 is extended in the z-direction to be connected to a pickup cover 712 on a side of an objective lens 753. Along with this, the pickup cover 712 is extended toward a first bearing portion 715a, and an end of the pickup cover 712 is connected to the first bearing portion 715a. The remaining construction is the same as that in the first embodiment shown in FIG. 3.

Heat generated from the focusing coils 751 and tracking coils 752 is transmitted to the pickup cover 712 through the yoke 756 to be radiated directly to a surrounding air as well as to the first bearing portion 715a by the rotating flow by an optical disk. It is possible to increase a quantity of heat radiated from the focusing coils 751 and the tracking coils 752 in an opposite direction to a semiconductor laser 72. Since the pickup cover 712 acts also as a radiating member, parts can be reduced in cost without bringing about an increase in the number of parts and assembling processes.

Figure 6:
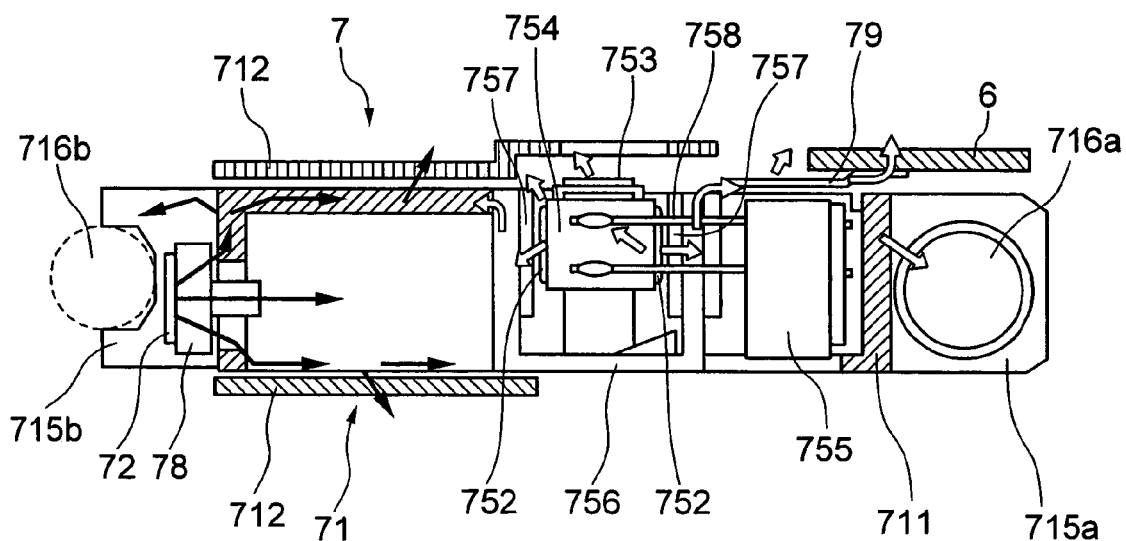
FIG. 6 is a vertical cross sectional view of a fourth embodiment of an optical pickup device according to the invention.

FIG. 6 shows a fourth embodiment of the optical pickup device 7. No radiating plate is used also in the fourth embodiment of FIG. 6. Instead, a folded plate spring member 79 is provided, which is fixed at one end thereof to a yoke 756 and has the other end extended to a first bearing portion 715a. The plate spring member 79 is metallic, and an end thereof toward the first bearing portion 715a is thermally connected to the unit mechanism 6. The remaining construction is the same as that in the first embodiment shown in FIG. 3. According to the fourth embodiment, heat generated from the focusing coils 751 and tracking coils 752 can be radiated directly to the unit mechanism 6 to lead to an increase in efficiency of radiation.

Figure 7:
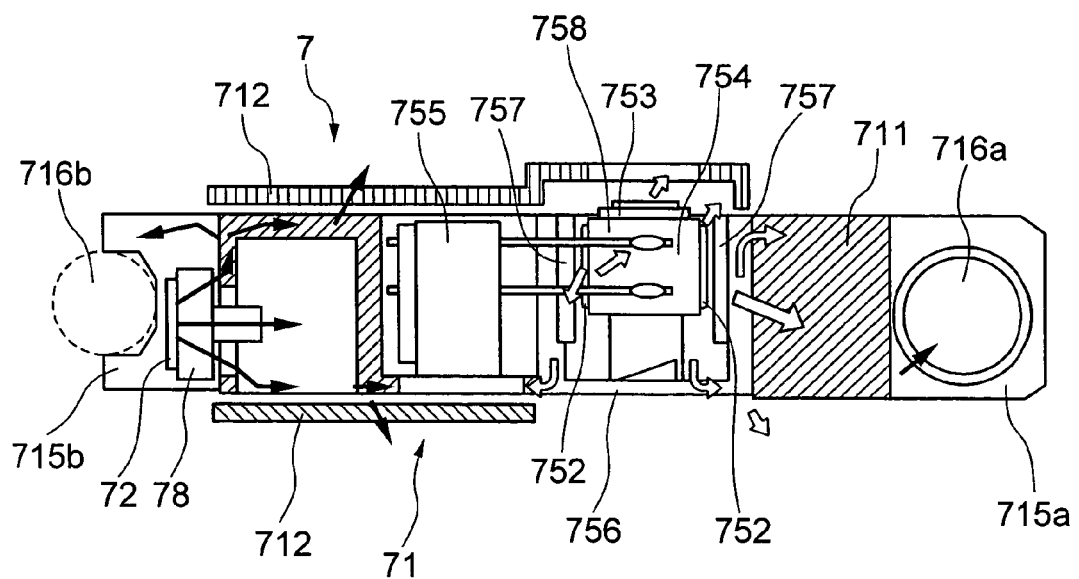
FIG. 7 is a vertical cross sectional view showing a fifth embodiment of an optical pickup device according to the invention.

FIG. 7 shows a fifth embodiment of the optical pickup device 7. In the fifth embodiment, a fixed portion 755 is arranged between a semiconductor laser 72 and a lens holder 754. Also, no radiating plate is used also in the fifth embodiment. The remaining construction is the same as that in the first embodiment shown in FIG. 3. According to the fifth embodiment, a first bearing portion 715a and a yoke 756 are directly connected to each other to thereby enable decreasing heat resistance from the first bearing portion 715a to the yoke 756.

Since the fixed portion 755 made of a resin having a smaller thermal conductivity than that of a metallic pickup housing body 711 is arranged between the semiconductor laser 72 and the yoke 756, thermal insulation between the semiconductor laser 72 and the yoke 756 is increased. It is possible to reduce a quantity of heat transmitted to the semiconductor laser 72 of the pickup housing body 711 from the focusing coils 751 and the tracking coils 752. The optical pickup device 7 according to the embodiment is suited to an optical disk that needs a high laser output at the time of recording, and an optical disk for high-speed recording.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup device comprising:
    a semiconductor laser that causes outgoing of laser beam used for reproduction and recording of information on an optical disk;
    an objective lens that conducts the laser beam outgoing from the semiconductor laser to the optical disk;
    a focusing coil that drives the objective lens in a focusing direction;
    a tracking coil that drives the objective lens in a tracking direction;
    a yoke arranged in opposition to the focusing coil and the tracking coil;
    a pickup housing that accommodates therein the semiconductor laser, the objective lens, and the yoke; and
    first and second bearing portions that support the pickup housing to make the same movable, the first and second bearing portions being attached to the pickup housing and arranged on both sides with the objective lens therebetween; and wherein the yoke is thermally connected to the first bearing portion positioned on an opposite side of the yoke to the semiconductor laser.

2. An optical pickup device according to claim 1, wherein the yoke and the first bearing portion are connected to each other through a metallic plate.

3. An optical pickup device according to claim 1, wherein the yoke is extended toward the first bearing portion to connect between the yoke and the first bearing portion.

4. An optical pickup device according to claim 1, further comprising a pickup cover opposed to an optical disk to be extended and arranged toward the first bearing portion, and wherein the pickup cover is connected to the yoke and the first bearing portion.

5. An optical pickup device according to claim 1, wherein the tracking coil is brought into contact with the focusing coil in positions corresponding to inner and outer edges of the optical disk.

6. An optical pickup device according to claim 2, wherein the tracking coil is brought into contact with the focusing coil in positions corresponding to inner and outer edges of the optical disk.

7. An optical pickup device according to claim 3, wherein the tracking coil is brought into contact with the focusing coil in positions corresponding to inner and outer edges of the optical disk.

8. An optical pickup device according to claim 4, wherein the tracking coil is brought into contact with the focusing coil in positions corresponding to inner and outer edges of the optical disk.

9. An optical pickup device according to claim 1, wherein a metallic plate having elasticity is connected to the yoke and the metallic plate is brought into contact with that metallic member, which is disposed in an opposite side of the yoke to the semiconductor laser and provided inside the optical pickup device.

10. An optical pickup device according to claim 2, wherein a metallic plate having elasticity is connected to the yoke and the metallic plate is brought into contact with that metallic member, which is disposed in an opposite side of the yoke to the semiconductor laser and provided inside the optical pickup device.

11. An optical pickup device according to claim 3, wherein a metallic plate having elasticity is connected to the yoke and the metallic plate is brought into contact with that metallic member, which is disposed in an opposite side of the yoke to the semiconductor laser and provided inside the optical pickup device.

12. An optical pickup device according to claim 4, wherein a metallic plate having elasticity is connected to the yoke and the metallic plate is brought into contact with that metallic member, which is disposed in an opposite side of the yoke to the semiconductor laser and provided inside the optical pickup device.

13. An optical pickup device comprising:
a semiconductor laser that causes outgoing of laser beam;
an objective lens that conducts the laser beam outgoing from the semiconductor laser to an optical disk;
a lens holder that holds the objective lens;
a yoke arranged in opposition to the lens holder;
a support member that supports the lens holder at one end thereof;
a fixed portion that supports the lens holder at the other end thereof; and
first and second bearing portions that support the lens holder to enable direct acting thereof, and wherein
the first bearing portion positioned on an opposite side of the yoke to the semiconductor laser is thermally connected to the yoke.

14. An optical pickup device according to claim 13, wherein the fixed portion is arranged between the objective lens and the semiconductor laser.

15. An optical pickup device according to claim 13, wherein a metallic plate having elasticity is connected to the yoke and the metallic plate is brought into contact with that metallic member, which is disposed in an opposite side of the yoke to the semiconductor laser and provided inside the optical pickup device.

16. An optical pickup device according to claim 14, wherein a metallic plate having elasticity is connected to the yoke and the metallic plate is brought into contact with that metallic member, which is disposed in an opposite side of the yoke to the semiconductor laser and provided inside the optical pickup device.

17. An optical disk apparatus including the optical pickup device according to claim 1.

18. An optical disk apparatus including the optical pickup device according to claim 13.

* * * * *